Aug. 5, 1958  A. D. BROWN, JR., ET AL  2,845,802
DRIVE MECHANISM

Filed Feb. 1, 1954  2 Sheets-Sheet 1

INVENTORS
LEO F. VALENTI &
ARLING DIX BROWN, JR.
BY
William J. Flynn
ATTORNEY

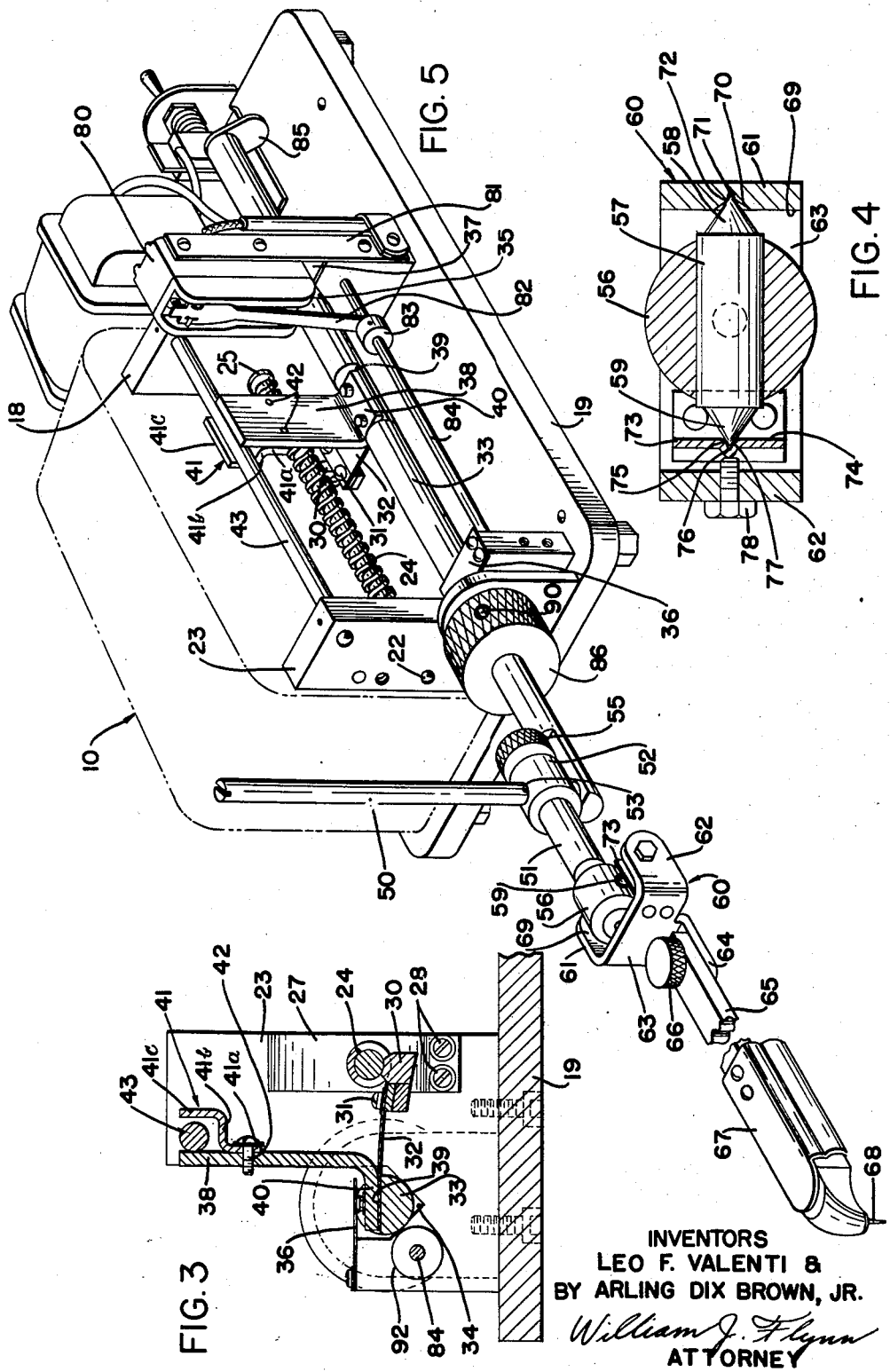

United States Patent Office 2,845,802
Patented Aug. 5, 1958

2,845,802

DRIVE MECHANISM

Arling Dix Brown, Jr., East Cleveland, and Leo F. Valenti, Garfield Heights, Ohio, assignors to Clevite Corporation, Cleveland, Ohio, a corporation of Ohio Application February 1, 1954, Serial No. 407,518

13 Claims. (Cl. 74—57)

This invention relates to a drive mechanism for converting rotary motion into translatory longitudinal motion, and is particularly directed to such a mechanism for imparting reciprocatory movement from a reversible rotary drive to the stylus of a surface roughness measuring instrument.

The primary utility of the present invention is in connection with a motor driven surface roughness measuring device having a surface-contacting stylus which it is intended to reciprocate back and forth from a reversible rotary drive, which advantageously may be of the type disclosed in the copending application of A. Dix Brown and Leo F. Valenti, Serial No. 384,632, filed October 7, 1953, and assigned to the same assignee as the present invention. For the proper operation of such a surface roughness measuring instrument it is necessary to convert the rotary motion of the output shaft of the reversible drive into reciprocatory movement of a shaft which actuates the stylus back and forth at a constant linear speed. Also, in order to make the surface roughness measuring instrument adaptable for various uses, another practical requirement is that the stroke of the reciprocatory stylus be adjustable anywhere from 1/32 inch to 3 inches.

The present invention is directed to a device which satifies the foregoing, as well as other practical requirements for such a drive mechanism in this particular type of instrument. While the present invention has been devised with this particular purpose in mind, it may be used also in other applications where it is desired to employ a drive mechanism having the advantageous characteristics of this particular mechanism.

Accordingly, it is an object of the present invention to provide a novel and improved drive mechanism for converting rotary motion into translatory longitudinal movement.

It is also an object of this invention to provide a novel drive mechanism for converting reversible rotary motion into reciprocation which is adjustable in stroke.

Another object of this invention is to provide a novel drive mechanism for converting rotary motion into translatory longitudinal movement which has a minimum of "play" and frictional drag therein.

Other and further objects and advantages of this invention will be apparent from the following description of the preferred embodiment thereof, illustrated in the accompanying drawings.

In the drawings:

Figure 3 is a transverse section through the drive mechanism taken along the line 3—3 in Fig. 2;

Figure 4 is a section through the pivotal mounting for the stylus support, taken along the line 4—4 in Fig. 1; and Figure 5 is a perspective view of the present drive mechanism.

Figure 1:
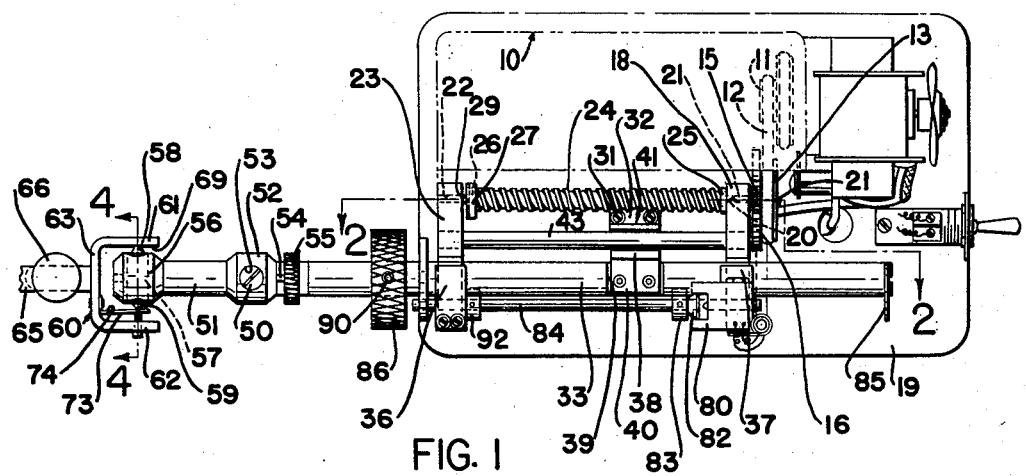
Figure 1 is a top view of the present drive mechanism.
Figure 2:
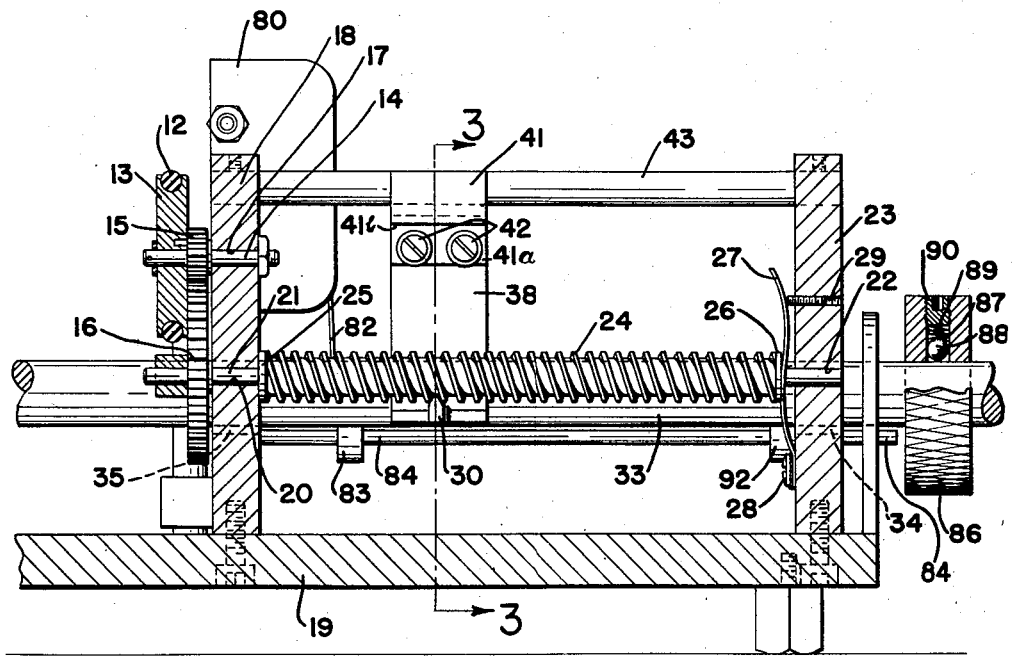
Figure 2 is a longitudinal section through the drive mechanism, taken along the line 2—2 in Fig. 1.

Referring first to Fig. 5, the drive mechanism of this invention is intended to be driven from a reversible drive, indicated generally in dashed-line outline at 10. The reversible drive 10 preferably is of the type disclosed and claimed in the copending application Serial Number 384,632, mentioned above. The reversible drive 10 has an output shaft which carries a small pulley 11 (Fig. 1) around which a rubber belt 12 extends. The rubber belt 12 also extends around a larger pulley 13, which is part of the input to the drive mechanism of the present invention. As best seen in Fig. 2, the pulley 13 is mounted on a rotary shaft 14 which carries a pinion 15 meshing with a larger gear 16. The pinion shaft 14 is mounted for rotation at a horizontal bore 17 formed in an upstanding support wall 18 mounted on a horizontal base 19.

The upstanding wall 18 also is formed with a bore 20 at which one end of a rotary screw shaft 21 is supported for rotation. Gear 16 is secured rigidly to the screw shaft 21 to impart rotation thereto when driven by pinion 15 from the reversible drive 10. At its opposite end the screw shaft 21 is supported for rotation at a horizontal bore 22, which extends through an upstanding support wall 23 mounted on base 19. The screw shaft 21 carries a square thread drive screw 24, which is integral with the screw shaft and which is located between the upstanding walls 18 and 23. The drive screw 24 has a length less than spacing between the upstanding walls 18 and 23 and at its opposite ends terminates in integral thrust collars 25 and 26. A leaf spring 27, mounted at its lower end at the inner face of upstanding wall 23 by means of a screw 28, is biased to bear against the outer face of thrust collar 26 on the drive screw 24, to thereby bias the screw to the left in Fig. 2 to position the thrust collar 25 on the screw abutting snugly against the inner face of the upstanding wall 18, for a purpose which will be apparent hereinafter. A set screw 29 mounted in the upstanding wall 23 bears against leaf spring 27 adjacent its upper end and may be adjusted to vary the bias force exerted by this spring on the drive screw 24.

The rotary drive screw 24 drives a follower 30 in the form of a nut segment meshing with the screw. The follower 30 is rigidly secured, by means of screws 31, to the outer end of a leaf spring 32 (Fig. 3) mounted rigidly at its opposite end at a cut-away flat portion 39 on the upper side of a reciprocatory shaft 33. The leaf spring 32 is biased to exert continually an upward force on the follower 30, to maintain the latter in mesh with drive screw 24 and thereby minimize "play" between the drive screw 24 and shaft 33.

The shaft 33 rides along upwardly facing V-grooves 34 and 35 formed in the upstanding walls 23 and 18, respectively. At each of these V-grooves the upstanding walls carry overlying leaf springs 36 and 37, respectively, which bear down on the top of shaft 33 to maintain it seated on the V-grooves.

In order to maintain shaft 33 extending parallel to the axis of rotation of drive screw 24, there is provided a rigid upstanding yoke like structure including an elongated finger 38 secured rigidly to shaft 33 at the cut-away segment 39 thereof, at which the leaf spring 32 is mounted. In the illustrated embodiment, the upstanding finger 38 is formed with a horizontal, outturned base 40 which overlies one end of the leaf spring 32 and clamps the latter in place on shaft 33, as best seen in Fig. 3. Adjacent its upper end the finger 38 carries a member 41 which consists of a vertical mounting segment 41a secured in face to face relation with the inner face of finger 38 by means of screws 42, an out-turned horizontal portion 41b which extends away from finger 38, and a vertical segment 41c projecting up from this out-turned portion in spaced parallel relation to the finger 38. The assembly of finger 38 and member 41 defines a yoke-like structure which at its upper end extends closely adjacent to opposite sides of a horizontal bar 43, which extends parallel to the axis of rotation of screw 24 and parallel to the axis of shaft 33 which is mounted rigidly at either end on the upstanding walls 18 and 23. With this construction, if the shaft 33 should tend to tilt, so that its axis would be skewed with respect to the axis of rotation of screw 24, one or the other of the fingers at the upper end of this yoke-like structure would engage the rigid bar 43 and prevent any such tilting to an appreciable extent.

At its outer end the reciprocatory shaft 33 carries an upstanding post 50 on which is clamped adjustably a horizontal extension rod 51. At its inner end rod 51 carries a tubular extension 52 formed with a vertical passage 53 which receives snugly the upstanding post 50. An adjustable set screw 54 having a knurled knob 55 at its outer end is threaded into the tubular extension 52 to engage post 50 and lock the rod 51 in the desired position vertically along post 50.

At its outer end the horizontal rod 51 provides a pivotal support for the stylus as follows: A cylindrical hub 56 is attached integrally to the outer, forward end of rod 51. Hub 56 receives a horizontal cross pin 57, which extends perpendicular to rod 51. At its opposite ends the cross pin 56 terminates in identical conical pivot segments 58 and 59, respectively, which project beyond opposite sides of the hub 56. These pivot segments provide a pivotal support for a bracket 60 on which the pen stylus is adapted to be clamped. As shown in Fig. 5, bracket 60 is generally yoke shaped, with spaced arms 61, 62 extending on opposite sides of hub 56, a bridging portion 63 interconnecting the arms 61, 62 forwardly of the forward end of hub 56, and a horizontal flat extension 64 extending forward from the bridging portion. The extension 64 provides a mounting for an extension bar 65, which is clamped adjustably thereon by means of a screw 66. At its forward end the extension bar 65 supports the cartridge 67 for the stylus 68 which it is intended to reciprocate back and forth across the surface whose roughness is being determined. The details of the stylus and cartridge form no part of the present invention and are shown in general outline only in Fig. 5.

The bracket 60, which provides the support for the stylus 68, is pivotally supported by the cross pin 56 in such a manner that there is a minimum frictional drag at its pivotal mounting. As best seen in Fig. 4, the bracket arm 61 at its inner face 69 is formed with a recess for receiving the pointed conical extremity of the pivot segment 58 on cross pin 57. This recess consists of an outer portion defined by a truncated conical wall portion 70 opening out onto the flat inner wall 69 of the bracket arm 61. At its inner extremity the conical wall portion 70 terminates in a generally conical depression 71. The conical wall portion 70 defines a wider angle than the angle formed by the conical pivot segment 58 on cross pin 57, while the depression 71 defines a smaller angle than the angle formed by the pivot segment 58. With this construction the pivot segment 58 seats in a positive manner at the circular line 72 formed by the junction of wall portion 70 and the depression 71. This provides a circular line contact between the bracket wall 61 and the pivot segment 58 entirely around the periphery of this pivot segment.

The bracket 60 supports a leaf spring 73 which is secured at one end to the inner face of the bridging portion 63 on the bracket and which extends away from its mounting generally parallel to the bracket arm 62 at the inner side thereof. This spring is formed with a recess at its inner face 74 for receiving the other pivot segment 59 on the cross pin 57. As shown in Fig. 4 this recess is defined partially by a truncated conical wall portion 75, which opens out onto the inner face 74 of spring 73. At its inner extremity this conical wall portion terminates in a generally conical depression 76.

The conical wall portion 75 defines a wider angle than the angle formed by the conical pivot segment 59, while the angle formed by the depression 76 is smaller than the angle defined by the pivot segment. Accordingly, the pivot segment 59 seats in this recess at the circular line 77 formed by the juncture of the conical wall portion 75 and the depression 76, in substantially the same manner as the reception of the other pivot segment 58 in the recess in the bracket arm 61. Spring 73 is biased to extend away from the bracket arm 62 so as to bear against the pivot segment 59 to retain the parts in the assembled relation just described. A screw 78 extends through the bracket wall 62 and at its inner end is spaced about .010 inch away from the outer wall of leaf spring 73 at the recess therein to prevent the pivot segment 59 of cross pin 57 from being displaced out of the recess in this spring, which might end to happen under rough usage.

It will be apparent that the assembly of bracket 60 on cross pin 57 may be accomplished relatively simply since the pivotal mountings of the bracket arm 61 and spring 73 on the conical opposite ends of cross pin 57 are self-locating. Bracket 61 may be slipped readily onto the opposite ends of cross pin 57 to establish the circular line contacts between the conical ends of the cross pin and the bracket arm 61 and spring 73, respectively. In addition to its simplicity of assembly, this pivotal mounting of the bracket 60 on the cross pin 57 has very little frictional drag, so that it does not impose a significant load on the stylus cartridge 67 as the stylus 68 is displaced vertically upon moving over the irregularities in the surface being measured.

For controlling the stroke of the stylus there is provided a small, precision, snap-acting switch 80 which is suitably connected to the reversible drive 10 to control the direction of the drive. Switch 80 is supported by a bracket 81 mounted on the upstanding support wall 18. The switch is provided with an actuator in the form of an elongated lever 82 which extends down across the path of movement of a knob 83 secured to a reciprocatory stem 84. Switch lever 82 is biased to position its free end to the left of the switch in Fig. 5. Stem 84 is supported for reciprocation by the upstanding walls 18 and 23 and at its opposite ends projects beyond these walls, as best seen in Fig. 1. A depending finger 85 carried by the reciprocatory shaft 33 is positioned to engage the rear end of stem 84 upon movement of shaft 33 to the left a predetermined distance in Fig. 5. When this happens, the stem 84 is displaced to the left and knob 83 on this stem moves the same amount and releases the actuating force on switch actuator 82. A second knob 92 secured to stem 84 (Fig. 1) is positioned to abut against the inner face of wall 23 to limit the displacement of this stem to the left in Figs. 1 and 5. An enlarged knurled knob 86, mounted on shaft 33 at the front side of wall 23 is positioned to engage the forward end of stem 84 upon movement of shaft 33 a predetermined amount to the right in Fig. 5. When this happens, the stem 84 and knob 83 thereon are displaced to the right, and knob 83 exerts a force on the free end of switch actuator 82 to depress the latter toward the switch and thereby actuate the switch.

As shown in Fig. 2, knob 86 is formed with a radial passage 87 which receives a ball 88, which is spring pressed by a coil spring 89 under compression between the ball and a screw 90 threadedly received in the outer end of this passage. Ball 88 frictionally engages shaft 33, permitting the stem 86 to be slid manually along the shaft 33 to any desired location thereon, at which position the stem will be maintained unless deliberately displaced manually.

In the operation of this mechanism, while the switch actuator 82 is depressed the switch 80 conditions the reversible drive to impart a "forward" drive to the stylus, moving shaft 33 and the stylus to the left in Fig. 3. After the stylus has moved "forward" to the left a predetermined distance the shaft 33 will have moved its depending finger 85 into engagement with the outer end of stem 84. When this happens, stem 84 is displaced to the left and the knob 83 on this stem releases the switch actuator 82 to trip switch 80. Accordingly, switch 80 causes the drive 10 to reverse in direction and drive shaft 33 and the stylus to the right in Fig. 5. After the stylus has been moved in the "reverse" direction a predetermined distance determined by the position of knob 86 on shaft 33, this knob engages the forward end of stem 84 and displaces this stem and the knob 83 thereon to the right in Fig. 5. This actuation depresses the switch actuator 82 to actuate switch 80, which conditions the reversible drive to again impart a "forward" drive to the stylus. This cycle repeats indefinitely as long as the reversible drive 10 is energized, so that the stylus 68 is moved back and forth across the surface being measured. Obviously, the position of knob 86 on shaft 33 determines the distance through which the stylus moves in each direction. The stroke of the stylus may be as short as 1/32 inch and as long as 3 inches or more, if desired.

In the operation of this mechanism, when the stylus is being driven "forward," as described, it exerts a load on the drive screw 24 which imparts to the screw an end thrust tending to force the screw to the left in Fig. 2 and maintaining the thrust collar 25 on this screw abutting against the inner face of the upstanding support wall 18. However, when the stylus is being driven in the "reverse" direction it exerts a load on drive screw 24 which imparts to that screw an end thrust tending to force it to the right in Fig. 2. Such axial displacement of the drive screw 24 would be undesirable, of course, since it would interfere with the proper uniform-speed stroke of the stylus. The spring 27 prevents such undesired axial displacement of drive screw 24 by overcoming this end thrust on the screw, thereby maintaining the screw in its proper axial position, with its thrust collar 25 abutting against the inner face of wall 18. It will be noted that this desirable result is accomplished in the present invention by a structural arrangement of extreme simplicity which may be assembled readily and inexpensively.

While the objects and the advantageous results of the present invention preferably are achieved by the particular construction described and shown herein in detail, it is to be understood that this invention is susceptible of other and different structural embodiments having an equivalent mode of operation. Accordingly, while there has been disclosed herein the presently preferred organization of elements for accomplishing the purpose of the present invention it is to be understood that various modifications, omissions and refinements which depart from the disclosed embodiment may be adopted without departing from the spirit and scope of this invention.

We claim:

1. In a drive mechanism for converting reversible rotary motion into reciprocatory movement, the combination of a pair of spaced supports, a rotary screw extending between said supports and supported for rotation therein, a follower comprising a substantially wedge-shaped single-thread nut threadedly engaging said screw to be displaced lengthwise along the screw in response to rotation of the screw, said screw carrying at one end a thrust collar abutting against a first one of said supports, a driven member mounted substantially parallel to said rotary screw and connected to said follower to be displaced longitudinally upon rotation of the screw, said driven member in one direction of rotation of the screw exerting an end thrust on said screw to force said thrust collar against said first support, said driven member in the opposite direction of rotation of the screw exerting an end thrust on the screw tending to displace it in the direction of said second support, said wedge-shaped single-thread nut moving transverse to the axis of said screw due to non-parallelism of said screw and said driven member without thereby causing relative longitudinal motion between said screw and said follower and resilient means acting against said screw and overcoming said last-mentioned end thrust on the screw to maintain the screw positioned with said thrust collar abutting against said first support.

2. In a drive mechanism for converting reversible rotary motion into reciprocatory movement, the combination of a pair of spaced upstanding walls, a rotary screw extending between said walls and supported for rotation therein, a follower comprising a substantially wedge-shaped single-thread nut threadedly engaging said screw to be displaced lengthwise along the screw in response to rotation of the screw, said screw carrying at one end a first thrust collar abutting against the inner face of a first one of said end walls, said screw at its opposite end carrying a second thrust collar located adjacent the inner face of the other end wall, a driven member mounted substantially parallel to said rotary screw and connected to said follower to be displaced longitudinally upon rotation of the screw, said driven member in one direction of rotation of the screw exerting an end thrust on said screw to force said first thrust collar against the inner face of said first end wall, said driven member in the opposite direction of rotation of the screw exerting an end thrust on the screw tending to force said second thrust collar toward the inner face of said second end wall, said wedge-shaped single-thread nut moving transverse to the axis of said screw due to non-parallelism of said screw and said driven member without thereby causing relative longitudinal motion between said screw and said follower and a leaf spring acting between said second collar and said second end wall and overcoming said last-mentioned end thrust on the screw to maintain the screw positioned with said first thrust collar abutting against said first end wall.

3. In a drive mechanism for a surface roughness measuring instrument, the combination of a pair of spaced upstanding walls, a horizontally extending reversible rotary screw extending between said walls and supported for rotation therein, a follower comprising a substantially wedge-shaped single-thread nut threadedly engaging said screw to be displaced lengthwise along the screw in response to rotation of the screw, said screw carrying at one end a first thrust collar abutting against the inner face of a first one of said walls, said screw at its opposite end carrying a second thrust collar located adjacent the inner face of the other end wall, reciprocatory stylus means including a driven member mounted substantially parallel to said screw for movement across a surface whose roughness is to be measured connected to said follower to be displaced longitudinally parallel to the screw axis upon rotation of the screw, said wedge-shaped single-thread nut moving transverse to the axis of said screw due to non-parallelism of said screw and said driven member without thereby causing relative longitudinal motion between said screw and said follower said stylus in one direction of rotation of the screw exerting an end thrust on said screw to force said first thrust collar against the inner face of said first end wall, said stylus in the opposite direction of rotation of the screw exerting an end thrust on the screw tending to force said second thrust collar toward said second end wall, and a leaf spring mounted on said second end wall and bearing against said second collar to overcome said last-mentioned end thrust on the screw and maintain the screw positioned with said first thrust collar abutting against said first end wall.

4. In a drive mechanism for converting rotary motion into longitudinal motion, the combination of a horizontally extending rotary screw, a shaft mounted for reciprocation substantially parallel to the screw axis, a substantially wedge-shaped single-thread nut segment threadedly engaging the screw, and a leaf spring mounted at one end on said shaft and at its other end carrying said nut segment, and extending in a direction perpendicular to the axes of said screw and said shaft said leaf spring exerting a continuous force on said nut segment to maintain the latter in threaded engagement with the screw for imparting longitudinal movement to the shaft in response to rotation of the screw, said wedge-shaped single-thread nut moving transverse to the axis of said screw due to non-parallelism of said screw and said shaft without thereby causing relative longitudinal motion between said screw and said shaft.

5. In a drive mechanism for converting rotary motion into reciprocatory motion, the combination of a horizontally extending rotary screw, a pair of spaced upstanding walls, a reciprocatory shaft mounted on said upstanding walls for reciprocation parallel to the axis of the screw, a wedge-shaped single-thread follower threadedly engaging said screw to be displaced lengthwise along the screw in response to rotation of the screw, a connection between the shaft and said follower to displace the shaft longitudinally upon such displacement of said follower as the screw rotates, a rigid rod supported to extend in the plane of the axis of the screw, and a rigid U-shaped member connected to the shaft and formed with fingers which extend next to said rod on opposite sides thereof to restrain the shaft against skewing with respect to the axis of the screw and to prevent binding of said U-shaped member upon the rod due to non-parallelism of said rod with respect to said screw within their common plane.

6. The combination of claim 5, wherein said follower is in the form of a single-thread nut segment threadedly engaging the underside of the screw, and said connection between the shaft and said follower comprises a leaf spring exerting an upward force on said follower to maintain said nut segment continuously in threaded engagement with the underside of the screw.

7. In a drive mechanism for the reciprocable stylus of a surface roughness measuring instrument, the combination of a support for the stylus, a reciprocatory shaft mounted to be driven in opposite directions longitudinally and connected to said support to reciprocate the stylus, a reversing switch controlling the direction of the drive to the shaft and having an actuator, a stem mounted for displacement axially in opposite directions parallel to the shaft and carrying intermediate its ends a projection positioned to engage the switch actuator, a finger carried by the shaft positioned to engage one end of the stem and displace the stem axially in one direction upon movement of the shaft in the same direction to actuate the switch and reverse the direction of the drive to the shaft, a knob on the shaft positioned to engage the opposite end of the stem and displace the stem in the opposite direction upon reverse movement of the shaft to actuate the switch to again reverse the direction of the drive to the shaft, and friction means acting between the knob and the shaft permitting manual adjustment of the knob along the shaft and maintaining the knob in the position to which it has been adjusted manually to thereby determine the stroke of the stylus.

8. In a drive mechanism for the reciprocable stylus of a surface roughness measuring instrument, the combination of a rotary screw, a reciprocatory shaft mounted for movement longitudinally in opposite directions parallel to the axis of the screw, a support for the stylus connected to said shaft to be reciprocated thereby, means for imparting longitudinal movement to the shaft in response to rotation of the screw in a direction determined by the direction of rotation of the screw, a reversing switch controlling the direction of rotation of the screw and having an actuator, a stem mounted for displacement axially in opposite directions parallel to the shaft and carrying intermediate its ends a projection positioned to engage the switch actuator, a finger carried by the shaft positioned to engage one end of the stem and displace the stem axially in one direction upon movement of the shaft in that direction to actuate the switch and reverse the direction of rotation of the screw to thereby reverse the direction of movement of the shaft, a knob on the shaft positioned to engage the opposite end of the stem and displace the stem in the opposite direction upon said reverse movement of the shaft to actuate the switch to again reverse the direction of rotation of the screw for again reversing the direction of movement of the shaft, friction means acting between the knob and the shaft permitting manual adjustment of the knob along the shaft and maintaining the knob in the position to which it has been adjusted manually to thereby determine the stroke of the stylus, a rigid rod supported to extend parallel to the axis of the screw, and a rigid member connected to said shaft and extending closely adjacent to opposite sides of said rod to prevent skewing of the shaft with respect to the screw upon longitudinal movement of the shaft.

9. In a drive mechanism for the reciprocable stylus of a surface roughness measuring instrument, the combination of a horizontally extending rotary screw, a pair of spaced upstanding end walls, a reciprocatory shaft mounted on the end walls for reciprocation parallel to the axis of the screw, a support for the stylus connected to said shaft to be reciprocated thereby, a follower threadedly engaging said screw to be displaced lengthwise along the screw in response to rotation of the screw, a connection between the shaft and said follower to displace the shaft longitudinally upon such displacement of said follower as the screw rotates, a reversing switch controlling the direction of rotation of the screw and having an actuator, a stem mounted for displacement axially in opposite directions parallel to the shaft and carrying intermediate its ends a projection positioned to engage the switch actuator, a finger carried by the shaft positioned to engage one end of the stem and displace the stem axially in one direction upon movement of the shaft in that direction to actuate the switch and reverse the direction of rotation of the screw to thereby reverse the direction of movement of the shaft, a knob on the shaft positioned to engage the opposite end of the stem and displace the stem in the opposite direction upon said reverse movement of the shaft to actuate the switch to again reverse the direction of rotation of the screw for again reversing the direction of movement of the shaft, friction means acting between the knob and the shaft permitting manual adjustment of the knob along the shaft and maintaining the knob in the position to which it has been adjusted manually to thereby determine the stroke of the stylus, a rigid rod supported to extend parallel to the axis of the screw, a rigid member connected to the shaft and formed with fingers which extend next to said rod on opposite sides thereof to restrain the shaft against skewing with respect to the axis of the screw.

10. The drive mechanism of claim 9, wherein said rotary screw extends between said upstanding walls and is supported for rotation thereby, said screw carrying at one end a first thrust collar abutting against the inner face of a first one of said walls, said screw at its opposite end carrying a second thrust collar located adjacent the inner face of the other end wall, said stylus in one direction of rotation of the screw exerting an end thrust on said screw to force said first thrust collar against the inner face of said first end wall, said stylus in the opposite direction of rotation of the screw exerting an end thrust on the screw tending to force said second thrust collar toward said second end wall, and a leaf spring mounted on said second end wall and bearing against said second collar to overcome said last-mentioned end thrust on the screw and maintain the screw positioned with said first thrust collar abutting against said first end wall.

11. The mechanism of claim 10, wherein said follower is in the form of a nut segment threadedly engaging the underside of the screw, and said connection between the shaft and said follower comprises a leaf spring exerting an upward force on said follower to maintain said nut segment continuously in threaded engagement with the underside of the screw.

12. In a drive mechanism for the reciprocable stylus of a surface roughness measuring instrument, the combination of a driving member mounted for reciprocation horizontally, a support for the stylus, said driving member carrying conical pivot segments which project horizontally on opposite sides of the driving member perpendicular to the direction of movement of the driving member, said support for the stylus being formed with an arm which extends on one side of the driving member, said arm defining at its inner face a recess receiving one of the pivot segments on the driving member, said recess being formed by a truncated conical wall portion opening out at the inner face of said arm and defining a wider angle than the angle defined by said pivot segment and terminating at its inner end at a generally conical depression in said arm which defines a smaller angle than the angle defined by said pivot segment so that said arm on the stylus support has circular line contact with said pivot segment at the juncture of said conical wall portion and said depression in said recess on said arm, and a leaf spring mounted on said support and extending generally parallel to said arm at the opposite side of the driving member, said leaf spring being formed to define at its inner face a recess receiving the other conical pivot segment on the driving member, said recess in the leaf spring being formed by a truncated conical wall portion opening out at the inner face of the leaf spring and defining a greater angle than the angle defined by said other conical pivot segment and terminating at its inner end at a generally conical depression which defines a smaller angle than the angle defined by said other pivot segment so that the leaf spring has circular line contact with said other pivot segment at the juncture of said conical wall portion and said depression in said recess on said leaf spring, said leaf spring being biased toward said other pivot segment to receive the same snugly.

13. In a drive mechanism for the reciprocable stylus of a surface roughness measuring instrument, the combination of a horizontally extending rotary screw, a pair of spaced upstanding end walls, a reciprocatory shaft mounted on the end walls for reciprocation parallel to the axis of the screw, a support for the stylus connected to said shaft to be reciprocated thereby, a follower threadedly engaging said screw to be displaced lengthwise along the screw in response to rotation of the screw, said follower being in the form of a nut segment threadedly engaging the underside of the screw, a connection between the shaft and said follower comprising a leaf spring exerting an upward force on said follower to maintain said nut segment continuously in threaded engagement with the underside of the screw to displace the shaft longitudinally upon such displacement of said follower as the screw rotates, a reversing switch controlling the direction of rotation of the screw and having an actuator, a stem mounted for displacement axially in opposite directions parallel to the shaft and carrying intermediate its ends a projection positioned to engage the switch actuator, a finger carried by the shaft positioned to engage one end of the stem and displace the stem axially in one direction upon movement of the shaft in that direction to actuate the switch and reverse the direction of rotation of the screw to thereby reverse the direction of movement of the shaft, a knob on the shaft positioned to engage the opposite end of the stem and displace the stem in the opposite direction upon said reverse movement of the shaft to actuate the switch to again reverse the direction of rotation of the screw for again reversing the direction of movement of the shaft, friction means acting between the knob and the shaft permitting manual adjustment of the knob along the shaft and maintaining the knob in the position to which it has been adjusted manually to thereby determine the stroke of the stylus, a rigid rod supported to extend parallel to the axis of the screw, a rigid member connected to the shaft and formed with fingers which extend next to said rod on opposite sides thereof to restrain the shaft against skewing with respect to the axis of the screw, said screw extending between said upstanding end walls and supported for rotation thereby, said screw carrying at one end a first thrust collar abutting against the inner face of a first one of said walls, said screw at its opposite end carrying a second thrust collar located adjacent the inner face of the other end wall, said stylus in one direction of rotation of the screw exerting an end thrust on said screw to force said first thrust collar against the inner face of said first end wall, said stylus in the opposite direction of rotation of the screw exerting an end thrust on the screw tending to force said second thrust collar toward said second end wall, a leaf spring mounted on said second end wall and bearing against said second collar to overcome said last-mentioned end thrust on the screw and maintain the screw positioned with said first thrust collar abutting against said first end wall, said shaft carrying conical pivot segments which project horizontally on opposite sides of the shaft perpendicular to the direction of movement of the shaft, said support for the stylus being formed with an arm which extends on one side of the shaft, said arm defining at its inner face a recess receiving one of the pivot segments on the shaft, said recess being formed by a truncated conical wall portion opening out at the inner face of said arm and defining a wider angle than the angle defined by said pivot segments and terminating at its inner end at a generally conical depression in said arm which defines a smaller angle than the angle defined by said pivot segment so that said arm on the stylus support has circular line contact with said pivot segment at the juncture of said conical wall portion and said depression in said recess on said arm, and a leaf spring mounted on said support and extending generally parallel to said arm at the opposite side of the shaft, said leaf spring being formed to define at its inner face a recess receiving the other conical pivot segment on the shaft, said recess in the leaf spring being formed by a truncated conical wall portion opening out at the inner face of the leaf spring and defining a greater angle than the angle defined by said other conical pivot segment and terminating at its inner end at a generally conical depression which defines a smaller angle than the angle defined by said other pivot segment so that the leaf spring has circular line contact with said other pivot segment at the juncture of said conical wall portion and said depression on said recess on said leaf spring, said leaf spring being biased toward said other pivot segment to receive the same snugly.

References Cited in the file of this patent

UNITED STATES PATENTS

| | | |
|---|---|---|
| 777,116 | Louis | Dec. 13, 1904 |
| 1,150,125 | King | Aug. 17, 1915 |
| 1,497,405 | Robertson | June 10, 1924 |
| 2,019,829 | Price | Nov. 5, 1935 |
| 2,104,299 | Grundstein | Jan. 4, 1938 |
| 2,233,915 | Conrad | Mar. 4, 1941 |
| 2,259,291 | Chapman | Oct. 14, 1941 |
| 2,262,732 | Gruber | Nov. 11, 1941 |
| 2,340,658 | Goldman | Feb. 1, 1944 |
| 2,613,091 | Funnell | Oct. 7, 1952 |
| 2,773,391 | Bruestle | Dec. 11, 1956 |